United States Patent [19]

Barnard

[11] Patent Number: 5,000,059
[45] Date of Patent: Mar. 19, 1991

[54] CONTROL ASSEMBLY

[75] Inventor: Michael A. Barnard, Wichita, Kans.

[73] Assignee: Wescon Products Company, Wichita, Kans.

[21] Appl. No.: 379,885

[22] Filed: Jul. 14, 1989

[51] Int. Cl.$^5$ .......................... G05G 1/04; F16C 1/10
[52] U.S. Cl. .................................... 74/523; 74/500.5; 74/501.6; 74/475; 74/504
[58] Field of Search ...................... 74/527, 531, 500.5, 74/519, 501.6, 523, 501.5 R, 526, 471 R, 473 R, 502.2, 488, 471 P, 489, 475, 477, 876, 504

[56] References Cited

U.S. PATENT DOCUMENTS

| | | | |
|---|---|---|---|
| 2,480,083 | 8/1949 | McMillan | 74/501.6 |
| 3,413,870 | 12/1968 | Spease | 74/475 |
| 3,477,308 | 11/1969 | Wagstaff | 74/504 |
| 3,643,528 | 2/1972 | Van Der Loos | 74/876 |
| 4,126,054 | 11/1978 | Langford et al. | 74/475 |
| 4,324,149 | 4/1982 | Johansson et al. | 74/473 R |
| 4,445,394 | 5/1984 | Yapp et al. | 74/475 X |
| 4,485,689 | 12/1984 | Cambria | 74/477 |
| 4,949,591 | 8/1990 | Roelle | 74/531 |

Primary Examiner—Vinh T. Luong
Attorney, Agent, or Firm—Hovey, Williams, Timmons & Collins

[57] ABSTRACT

A control assembly for mechanically transmitting a signal from a sending unit to a receiving element is provided which enables the receiving unit to respond to shifting of the sending unit for reducing perceived hysteresis losses during shifting. The sending unit includes a wear plate defining a series of positions thereon for engagement by a shiftable control arm. The control arm is connected by a cable to the receiving element which includes an indicator on a mounting member. During initial shifting of the control arm, the wear plate, which is pivotally mounted, is limited in its travel by one or more prongs extending through the wear plate. Further shifting of the control arm moves the cable so that the indicator moves responsively thereto.

12 Claims, 1 Drawing Sheet

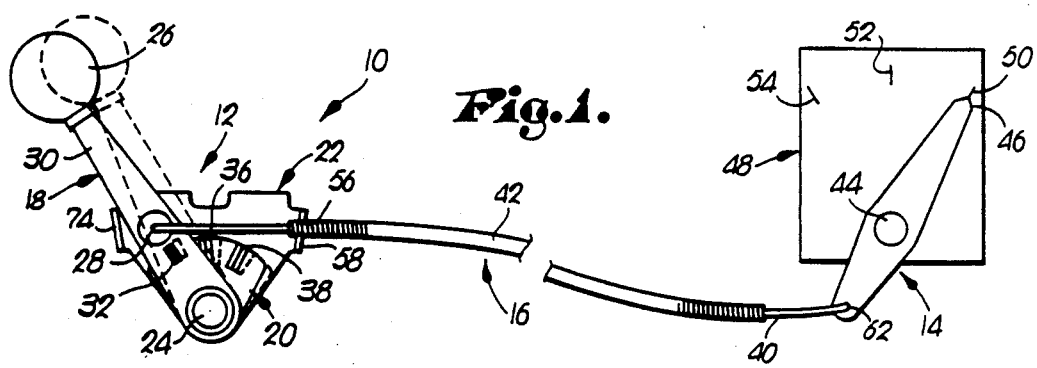
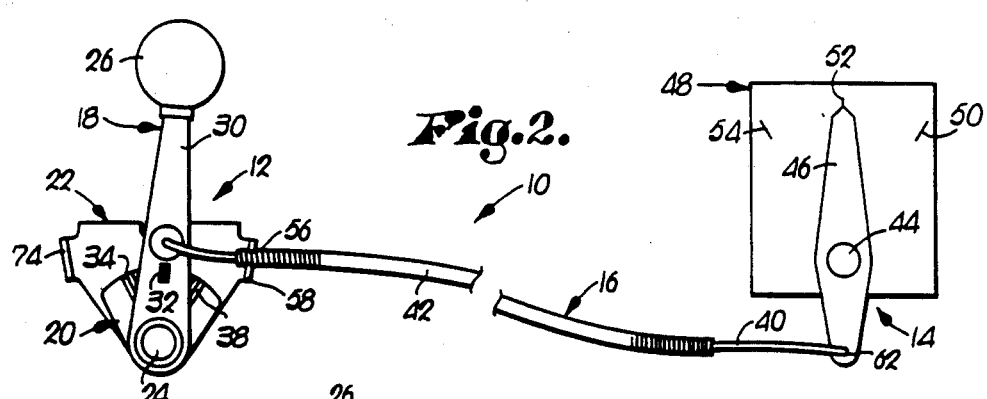
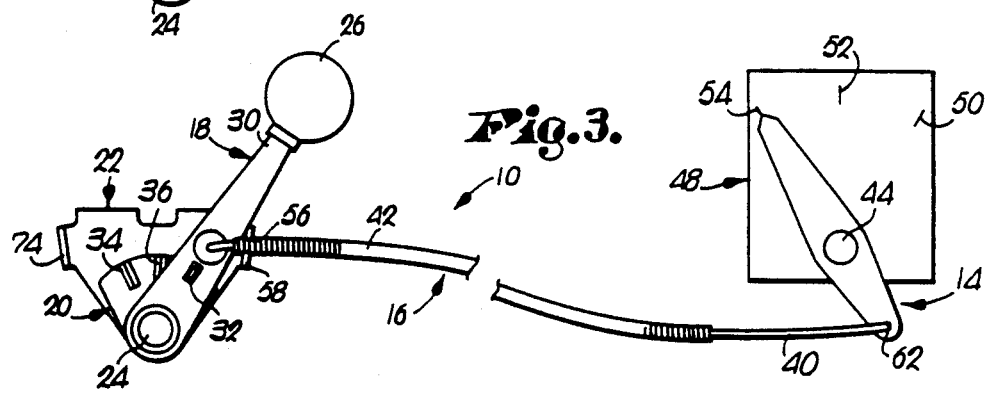
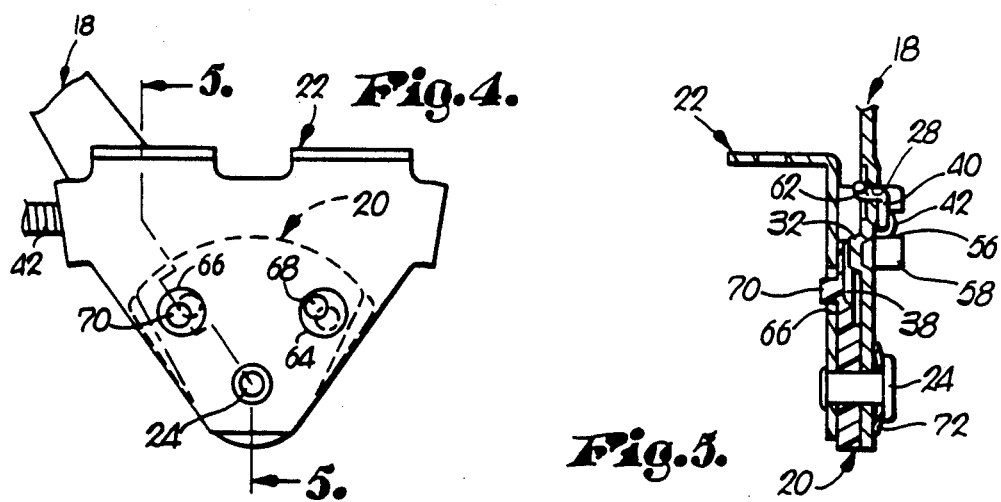
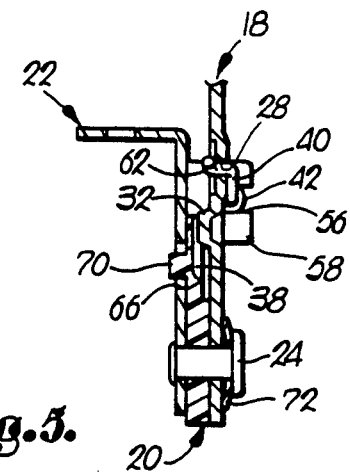

CONTROL ASSEMBLY

BACKGROUND OF THE INVENTION

1. Field of the Invention

This invention relates to a control assembly designed to consistent and responsive movement, via a mechanical linkage, between a shiftable control arm and a signal-receiving element. Its advantages include positive correlation between movement of the receiving element between a first and second location and shifting of the control arm between a first and second position, as well as ensuring that the location of the receiving element corresponds consistently to the position of the control arm during shifting.

2. Description of the Prior Art

Various means of mechanical linkage have been known in control circuits, whereby shifting of a control arm produces responsive movement in receiving element. For example, in the throttle control of a lawn mower, the user may often shift the throttle from a low to a medium and then to a high position to produce corresponding movement of a throttle linkage on a remotely located carburetor. A variety of other uses for such control assemblies have long been known, the control assemblies conventionally including a shiftable control arm coupled to a mounting member, connected by a cable linkage to a movable receiving element, the receiving element being movable responsive to movement of the control arm.

However, users of these prior control assemblies have long been presented with the problem of immediate, responsive movement of the receiving element responsive to shifting of the control arm. Ofttimes, even though the user perceives that the control arm has been shifted beyond a first position, the receiving element lagged behind and remained in that first location corresponding to the first position of the control assembly. For example, in a throttle control, the responsive movement of the carburetor linkage, representing the receiving element, would lag behind movement of the control arm. A further problem was presented by the inconsistency in movement of the receiving element. The receiving element might be located in one intermediate location during shifting of the control arm from low to medium, but be located at a different intermediate position during shifting of the control arm from a high to medium position. Obviously, when attempting to judge speed or other controllable factors, the user prefers that shifting of the control arm to one location is consistently indicated by a single corresponding position of the receiving element.

SUMMARY OF THE INVENTION

The problems outlined above are in large measure solved by the control assembly in accordance with the present invention. That is to say, the control assembly hereof produces consistent, immediately responsive movement of the receiving element upon shifting of the control arm from a first position to a second position.

The control assembly in accordance with the present invention includes a shiftable control arm, a movable receiving element, and a mechanical linkage, such as a cable. The control member is shiftably connected to a mounting member, with a wear plate located therebetween. The wear plate is provided with two, and preferably three or more shift notches corresponding to first and second positions for the control member, and the wear plate is mounted on the mounting member so that it is able to travel a limited distance during shifting of the control arm. The control arm is additionally provided with an ear which is locatable within the notch, whereby upon movement of the control arm, the wear plate moves responsibly.

However, the travel of the wear plate during shifting is limited, so that after a limited amount of travel, further shifting of the control arm causes it to move relative to the wear plate from a first notch to a second notch. Advantageously, the relative movement of the wear plate permits the sending unit to compensate for any lost motion in the cable linkage, whereby upon movement of the control arm out of the first notch, the receiving unit responds directly and begins movement directly towards a second position. Yet further, when three or more positions are included on the wear plate, the receiving element consistently locates in the same, intermediate position upon shifting between first and second and third and second positions. In a throttle control, speed of the engine is consistently maintained at the intermediate position regardless of the direction of movement of the control arm prior to such positioning.

The control arm and wear plate are preferably pivotally mounted on the mounting member, and the wear plate is provided with one or more prongs which extend into apertures on the mounting member. The apertures are slightly elongated, whereby the ears may move a limited distance of travel therewithin The "slack" within the linkage is taken up by the movement of the wear plate prior to the control arm disengaging from the first notch and moving towards the second notch during shifting. Thus, the user knows that shifting of the control arm out of the first position defined by the first notch will produce immediate results in the receiving element.

BRIEF DESCRIPTION OF THE DRAWING

FIG. 1 fragmentary front elevational view of the control assembly with a portion of the connecting cable removed, including a sending unit, a connecting cable and a receiving indicator, showing the control arm of the sending unit moved but not shifted out of its first position in phantom;

FIG. 2 is a view similar to FIG. 1 showing the control arm shifted into a second, intermediate position;

FIG. 3 is a view similar to FIGS. 1 and 2 showing the control arm shifted into a third, advanced position;

FIG. 4 is a fragmentary, enlarged, rear elevational view of the reverse side of the sending unit shown in FIGS. 1-3, showing the wear plate in phantom with the prongs thereon positioned within apertures of the mounting bracket; and FIG. 5 is a sectional view taken along line 5—5 of FIG. 4 showing the mounting bracket, wear plate and control arm pivotally interconnected, with the connecting cable attached to the control arm.

DESCRIPTION OF THE PREFERRED EMBODIMENT

Referring now to the drawing, a control assembly 10 in accordance with the present invention broadly includes a sending unit 12 which is operably and mechanically connected to a receiving element 14 by connecting cable 16 for mechanically linking the sending unit to the receiving element in responsive relationship.

In greater detail, sending unit 12 includes control arm 18 which is pivotally connected to a mounting bracket 22 by pivot pin 24. Wear plate 20 is also mounted on pivot pin 24 intermediate mounting bracket 22 and control arm 18. Control arm 18 is shiftable by means of a graspable handle 26 at one end thereof remote from pivot pin 24. A mounting hole 28 is located on lever arm 30 of control arm 18 intermediate handle 26 and pivot pin 24 for receiving one end of connecting cable 16 therein. Control arm 18 is also provided with an inwardly projecting ear 32 oriented for selective engagement with first notch 34, second notch 36 and third notch 38 defined on wear plate 20.

Wear plate 20 is preferably of a synthetic resin material, such as Nylon, and is mounted on pivot pin 24 for engagement with ear 32 of control arm 18. As will be described hereinafter, wear plate 20 is pivotally mounted with respect to mounting bracket 22, but its range of pivoting travel is limited.

Connecting cable 16 includes movable element 40 and stationary sheath 42 which is cooperatively sized with an opening 56 defined in forward stop 58. A first end 60 of movable element 40 projects through hole 28 whereby shifting of control arm 18 produces responsive movement in movable element 40.

A second, remote end 62 of movable element 40 is connected to indicator 46 of receiving element 14 by insertion through a hole and bending, welding, or by bolting it thereto. In one application, indicator 46 could serve as a pivotally mounted carburetor linkage. Indicator 46, as shown in FIG. 1, is pivotally mounted on indicator mount 48 whereby indicator 46 may pivot about axis 44 which is stationary relative to mounting bracket 22. Indicator mount 48 is provided with a first location 50, a second location 52, and a third location 54, each of the locations corresponding to first, second and third positions of the control arm 18 corresponding to first notch, second notch and third notch on wear plate 20.

Turning to FIG. 4, the rear or reverse side of mounting plate 22 is shown revealing a pair of pivot limiting apertures 64 and 66 for receiving a pair of abutment prongs projecting from wear plate 20 into the pivot limiting aperture 64 and 66. The pivot limiting apertures 64 and 66 are larger than abutment prongs 68 and 70 whereby wear plate 20 may move pivotally while prongs 68 and 70 shift within and are limited by the structure of mounting bracket 22 surrounding and defining the pivot limiting apertures 64 and 66.

Turning to FIG. 5, it may be appreciated that wear plate 20 is positioned intermediate mounting bracket 22 and control arm 18. In FIG. 5, the control arm has been shifted into the third position corresponding to third notch 38 of wear plate 20 with the wear plate being moved to the forward position as illustrated by the solid lines in FIG. 4.

A press washer 72 is employed to maintain frictional contact between control arm 18 and wear plate 20.

In operation, the control assembly 10 is shown in the first position with the lever arm 30 positioned against rear stop 74. In this position, the ear 32 is located within notch 34 corresponding to a first position, and indicator 46 is in the first location 50 as shown in FIG. 1. When the operator desires to move the control assembly so that the indicator 46 is pointed to the second location 52, as shown in FIG. 2, the operator grasps handle 26 to shift control arm 18 forwardly. During this operation, ear 32 initially remains engaged within notch 34 until the control arm 18 reaches the position shown in phantom in FIG. 1. This is due to the fact that the wear plate 20 is able to pivot a limited amount as constrained by the movement of the abutment prongs 68 and 70 within pivot limiting apertures 64 and 66. During the movement shown in FIG. 1 where the control arm 18 moves from the solid line to the position shown in phantom, hysteresis or "slack" in control cable 16 results in their being no movement of indicator 46. When the wear plate is stopped in its forward movement, the ear 32 slides up and out of first notch 34 and across the portion of the wear plate between first and second notches 34 and 36. Upon movement of control lever 18 forward when ear 32 moves out of first notch 34, indicator 46 instantly begins to move from the first location 50 to second location 52 as shown in FIG. 2. During this movement, no relative movement takes place between indicator mount 48 or pivot axis 44 and mounting bracket 22.

Upon the completion of shifting between first notch 34 corresponding to a first position and second notch 36 corresponding to a second position, the indicator will remain in second location 52. When the operator again desires to shift control lever 18 to produce responsive movement in indicator 46 whereby indicator 46 will point to third position 54, the user will grasp handle 26 and move the control arm 18 forward until the ear 32 arm engages third notch 38 corresponding to a third position as shown in FIG. 3. This produces corresponding movement in movable element 40 causing movement of indicator 46 from second location 52 to third location 54. Because wear plate 20 has already pivoted the maximum amount permitted by the movement of abutment prongs 68 and 70 within pivot limiting apertures 64 and 66, no pivoting of wear plate 20 takes place during shifting of the control arm from the second to the third position.

When the user desires to return the indicator 46 to second location 52 and first location 50 from the position 54 shown in FIG. 3, control arm 18 is moved to the left as shown in FIGS. 1-3. During the initial movement of control arm 18, the wear plate 22 initially moves with control arm 18 a limited amount while abutment prongs 68 and 70 move within pivot limiting apertures 64 and 66. As shown in FIG. 4, the abutment apertures would initially be in position shown by the solid lines when the control arm is in the third position corresponding to third notch 38, and thence would move to the right as shown in FIG. 4 until they reach the position shown in phantom in FIG. 4. While the control arm 18 and wear plate 20 move together this limited amount, the control arm 18 remains in the third position while the slack is taken out of the connecting cable 16. Because the ear 32 remains in the third notch, the operator is not misled into believing the initial movement of the control arm 18 has produced corresponding movement of the receiving element.

When the abutment prongs 68 and 70 are stopped by the portion of mounting bracket 22 surrounding pivot limiting apertures 64 and 66, wear plate 22 stops moving and ear 32 moves out of third notch 38 and across the portion of the wear plate between third notch 38 and second notch 36. Once ear 32 engages with second notch 36, the indicator 52 returns to the same position it previously occupied while shifting from the first notch 32 to the second notch 36 as shown in FIG. 2. Thereafter, the control arm 18 may be moved to the left towards first notch 34, again without further movement of wear plate 20.

This cycle may be repeated, producing consistent movement and positioning of indicator 46 during shifting of control arm 18 when interconnected by control cable 16. The operator can accurately perceive visually and by touch when movement of the receiving element 14 will begin by the position of the control arm 18 relative to wear plate 20, while knowing that the intermediate settings of the control arm 18 will yield consistent responses in the receiving element 14 regardless of the direction of shifting of the control arm.

I claim:

1. A control assembly comprising:
    a sending unit including a control member for shifting responsively to an input signal;
    a remotely located receiving element; and
    means for mechanically connecting said control member to said receiving element for moving said receiving element from a first location to a second location responsive to shifting of said control member,
    said sending unit further comprising a mounting member and a wear plate adjacent to said control member, said wear plate being positioned intermediate said mounting member and said control member and presenting structure defining a first position and a second position thereon, said control member being releasably engageable with said structure defining said first position and said second position,
    said sending unit including means for enabling limited responsive shifting of said wear plate relative to said mounting member a predetermined portion of the travel of said control member between said first location and said second location during shifting of said control member.

2. A control assembly as set forth in claim 1, said control member being pivotally mounted on said mounting member for pivoting about a first axis.

3. A control assembly as set forth in claim 2, said wear plate being pivotally mounted on said mounting member about said first axis.

4. A control assembly as set forth in claim 3, said mechanical connecting means including cable means.

5. A control assembly as set forth in claim 4, said cable means including an outer sheat and an inner cable movably element operably connecting said control member to said receiving element.

6. A control assembly as set forth in claim 5, said receiving element being carried by a receiving element mount, said mounting member being stationary with respect to said receiving element mount.

7. A control assembly as set forth in claim 2, said control member presenting a projection selectively engageable with said wear plate for producing pivoting of said wear plate during a limited length of travel of said control member.

8. A control assembly as set forth in claim 7, including structure interconnecting said wear plate and said mount.

9. In a control assembly for mechanically transmitting a control signal from a sending unit to a receiving element, said sending unit having a mounting member and a shiftable control member operatively connected by motive means to said receiving element for responsive movement of said receiving element during shifting of said control member, the improvement comprising a wear plate presenting structure defining a first position, a second position and a third position, said second position being intermediate said first and third positions, and means associated with said wear plate for enabling limited pivoting of said wear plate relative to said mounting member during shifting of said control member to produce substantially consistent location of said receiving element in said second position during shifting of said control member both from said first position to said second position and from said third position to said second position.

10. A control assembly as set forth in claim 9, said sending unit including a mounting member, said wear plate and said control member being pivotally mounted on said mounting member.

11. A control assembly as set forth in claim 10, including means operably connecting said wear plate and said mounting member for limiting the pivoting of said wear plate relative to said mounting member.

12. A control assembly as set forth in claim 10, said pivot limiting means comprising at least one abutment member extending from said wear plate into structure defining an aperture in said mounting member, said abutment being movable within said aperture.

* * * * *